(12) United States Patent
Bakhoum

(10) Patent No.: US 6,955,368 B2
(45) Date of Patent: Oct. 18, 2005

(54) QUICK ASSEMBLY, MINIMAL EFFORT CARRIAGE FOR MOVING HEAVY OBJECTS

(76) Inventor: Ezzat G. Bakhoum, P.O. Box 305, Marlton, NJ (US) 08053

(*) Notice: Subject to any disclaimer, the term of this patent is extended or adjusted under 35 U.S.C. 154(b) by 104 days.

(21) Appl. No.: 10/238,551

(22) Filed: Sep. 10, 2002

(65) Prior Publication Data
US 2004/0046345 A1 Mar. 11, 2004

(51) Int. Cl.[7] .................................................. B62B 1/00
(52) U.S. Cl. ........................ 280/79.3; 280/79.7; 280/35
(58) Field of Search ............................ 280/47.3, 47.23, 280/47.29, 47.315, 47.15, 79.11, 79.4, 79.5, 79.6, 79.7, 35, 43.12, 43, 43.21, 43.13, 47.13, 47, 285, 286, 287, 47.27, 47.41, 79.3; 16/19, 33, 43, 45, 20, 21, 22, 23, 35 D; 248/165, 166, 172, 188.6, 187; 403/16

(56) References Cited

U.S. PATENT DOCUMENTS

| | | | | |
|---|---|---|---|---|
| 211,828 A | * | 2/1879 | Ash | 280/35 |
| 234,336 A | * | 11/1880 | Schenck | 280/35 |
| 1,778,654 A | * | 10/1930 | Wright | 280/79.11 |
| 1,973,098 A | * | 9/1934 | Pride | 280/43.13 |
| 2,003,162 A | * | 5/1935 | Ulmer | 280/35 |
| 2,158,546 A | * | 5/1939 | Lang et al. | 248/167 |
| 2,215,425 A | * | 9/1940 | Longfellow | 280/35 |
| 2,219,609 A | * | 10/1940 | Askeris | 280/35 |
| 2,262,433 A | * | 11/1941 | Uecker et al. | 16/21 |
| 2,472,952 A | * | 6/1949 | Lennard | 280/35 |
| 2,537,554 A | * | 1/1951 | Seely | 280/79.11 |
| 2,598,831 A | * | 6/1952 | Ramey | 280/35 |
| 2,961,250 A | * | 11/1960 | Beach | 280/35 |
| 2,971,769 A | * | 2/1961 | Roy | 280/79.11 |
| 2,972,506 A | | 2/1961 | Haag | |
| 3,066,946 A | * | 12/1962 | Nelson | 280/79.11 |
| 3,319,974 A | * | 5/1967 | Ashley | 280/43.21 |
| 3,720,422 A | * | 3/1973 | Nelson | 280/35 |
| 3,923,318 A | * | 12/1975 | Renard et al. | 280/35 |
| 4,014,266 A | | 3/1977 | Naslund | |
| 4,025,676 A | | 5/1977 | Koellisch | |
| 4,213,624 A | * | 7/1980 | Sanders | 280/43.12 |
| 4,362,458 A | | 12/1982 | Jantzi | |
| 4,424,604 A | | 1/1984 | Dupuis | |
| 4,576,391 A | * | 3/1986 | Gerstner | 280/79.11 |
| 4,923,174 A | | 5/1990 | Loechner | |
| 5,299,817 A | * | 4/1994 | Chang | 280/35 |
| 5,362,083 A | | 11/1994 | Emanuele | |
| 5,496,013 A | | 3/1996 | Lussier | |
| 5,599,031 A | * | 2/1997 | Hodges | 280/79.11 |
| 5,709,397 A | | 1/1998 | Hall | |
| 5,772,223 A | | 6/1998 | Letourneau | |
| 5,826,893 A | * | 10/1998 | Snoeyenbos | 280/43 |
| 5,938,217 A | | 8/1999 | Wintz | |
| 6,095,533 A | * | 8/2000 | Balolia | 280/35 |
| 6,183,405 B1 | | 2/2001 | Schurig | |
| 6,202,774 B1 | | 3/2001 | Claassen | |

* cited by examiner

Primary Examiner—Hau Phan

(57) ABSTRACT

A kit used for mobilizing heavy objects such as items of furniture, boxes, appliances, etc. The apparatus is based on a plurality of rigid support structures, or "shoes", which are to be inserted under the corners of the item to be moved. Those support structures carry longitudinal and transverse conduits which can accept long, rigid link members, such as rods. The rods or link members are fastened to each other by screw-like threads, and are finally fastened to the conduits in the shoes. The net result is the formation of a rigid "cage" around the item to be moved. Each of the shoes is equipped with a wheel that is originally elevated above the ground plane. By lifting the rigid cage slightly on each side, the wheels will drop vertically and remain engaged. The cage, carrying the heavy object, can then be moved effortlessly.

19 Claims, 3 Drawing Sheets

QUICK ASSEMBLY, MINIMAL EFFORT CARRIAGE FOR MOVING HEAVY OBJECTS

BACKGROUND OF THE INVENTION

1. Field of the Invention

This invention relates to a method and an apparatus to facilitate the movement of large, heavy objects, such as furniture, boxed items, etc., inside a home, building or factory.

2. Description of the Related Art

At the present time, there is no simple solution for moving heavy objects, such as furniture items, inside a home or a factory, unless the item is already mounted on wheels. Apart from using heavy industrial equipment, such as a fork lift for example, a number of simple methods exist in the prior art to facilitate the movement of heavy objects. Unfortunately, none of these so called "simple" solutions is really effective. One solution, currently available in the market, and is shown in patents like U.S. Pat. No. 4,025,676, is based on the concept of inserting a smooth plastic dish or strip under the legs of the item to be moved in order to minimize friction. Experience has shown, however, that unless the item is relatively light, friction still represents a major problem. Another solution, such as the solution shown in U.S. Pat. No. 5,772,223, is to attach wheels temporarily to the legs of the item to be moved by using clamps. Unfortunately, if the item has no legs, or if it does have irregularly-shaped legs (i.e., not a cylinder or a square), then attaching clamps will be very difficult or impossible. In addition, considerable effort need to be exerted by the user to keep the item lifted while the clamps are being attached. Other solutions are shown in U.S. Pat. Nos. 5,709,397 and 5,938,217. The U.S. Pat. No. 5,709,397 patent shows a dolly that can be used to lift a heavy object by means of side-rails mounted on the object. This idea, of course, cannot be used to move objects which have no such side-rails. The U.S. Pat. No. 5,938,217 patent is based on the idea of inserting support rails under the item to be lifted and lifting the rails by means of turning side-bolts which are mounted on a rigid structure equipped with wheels. This invention, however, suffers from a number of deficiencies. First, the insertion of rails under a heavy item may be too difficult and can damage the floor underneath the rails. Secondly, the idea cannot be used with legged items (which is the case in many furniture models). Finally, the process of turning a plurality of bolts to lift the item can be very time consuming.

It is the objective of the present invention to provide a method and apparatus for moving heavy furniture items, boxes, appliances, etc., which is characterized by:

- Can be assembled in seconds;
- The assembly can be done by one person, with minimal effort;
- Does not require any modifications to existing items;
- Can be used with legged or non-legged items;
- Highly effective, since the item to be moved is mounted on wheels; and
- Quite inexpensive, which makes it suitable for home use as well as industrial use.

Other objectives and features of the invention will become fully apparent from the ensuing disclosure and appended claims.

SUMMARY OF THE INVENTION

In a broad aspect, the invention is based on a plurality of rigid support structures, or "shoes", which are to be inserted under the corners of the item to be moved. Such shoes or support structures can suitably be steel angles. Those support structures carry longitudinal and transverse conduits which can accept long, rigid link members, such as rods. The rods or link members are fastened to each other by means of screw-like threads, and are finally fastened to the conduits in the shoes. The net result is the formation of a rigid "cage" around the item to be moved. Each of the shoes is equipped with a wheel that is originally elevated above the ground plane. A mechanism inside the wheel assembly permits the wheel to drop vertically and remain engaged, once the shoe is lifted above the ground plane. Thus, by lifting the rigid cage slightly on each side, the wheels will engage and the cage will become mounted on wheels. The cage, carrying the heavy object, can then be moved effortlessly.

DETAILED DESCRIPTION OF THE INVENTION, AND PREFERRED EMBODIMENTS THEREOF

Figure 1A:
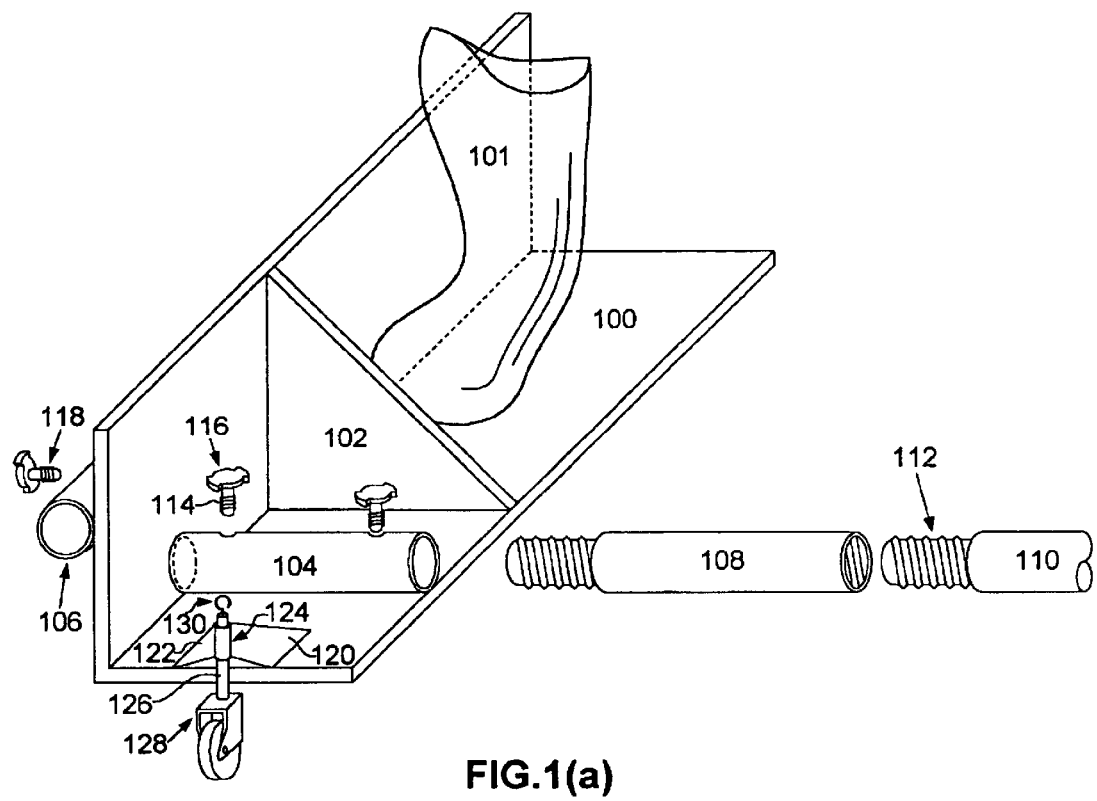
FIG. 1(a) shows a detailed view of the shoe, or angular support structure of the present invention, inserted under the leg of a furniture item. The figure shows the longitudinal and transverse conduits in the shoe; the wheel attached to the shoe; and the rods which are to be inserted in the conduits.

FIG. 1(a) shows the preferred embodiment of the invention. As shown, an angular section 100, preferably made of steel, is inserted under a corner of the heavy item that is to be moved. The corner may be a leg, such as the leg 101 shown in the figure, or may be a non-legged corner, such as the corner of a box (the inner surfaces the angular section may be padded in order to prevent damage to the corner of the object being carried). The angular section 100 comprises a wall 102 or a similar mechanism for fixing the leg and preventing it from moving past a specific point. Similar angular sections are to be inserted under the remaining legs or corners of the object. As shown, a transverse conduit 104 is welded to the angular section. This conduit can accept a rod 108 for insertion into the conduit. Another rod 110 is to be attached to rod 108 by means of a screw-like thread 112, as shown. Other rods are to be attached serially to rod 110 and are not shown in the figure. These rods are also preferably made of steel; though aluminum may be used as a lighter alternative. Another alternative, still, is to use hollow tubes instead of rods. Also welded to the angular section 100 is another, longitudinal conduit 106, which can accept rods in the longitudinal direction. Once rod 108 is inserted into the conduit 104, it can be secured in position by means of a screw 114 equipped with a knob 116 for easy tightening. More than one such screw may be used, as shown (the end points of these screws may be fitted with rubber or a similar material in order to prevent damage to the surface of the rod). Similarly, the longitudinal rods (not shown in the figure) can be secured to the conduit 106 by means of a plurality of screws such as 118. The total length of the rods used in the transverse direction (i.e., rod 108 plus the other rods attached serially to it) must equal or exceed the width of the item to be moved. Similarly, the total length of the rods used in the longitudinal direction must equal or exceed the depth of the item.

Figure 1B:
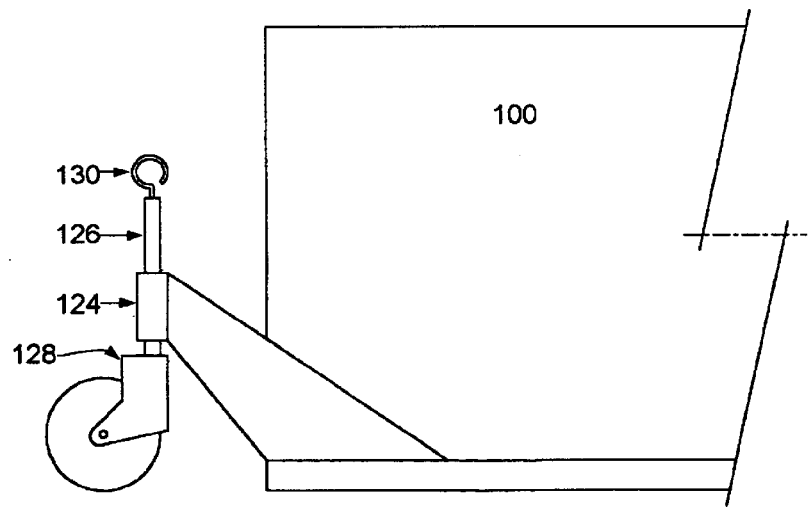
FIG. 1(b) shows a side view of the angular section in FIG. 1(a), with the detail of the wheel's support structure, as well as the position of the wheel relative to the angular section and relative to the ground plane.
Figure 3:
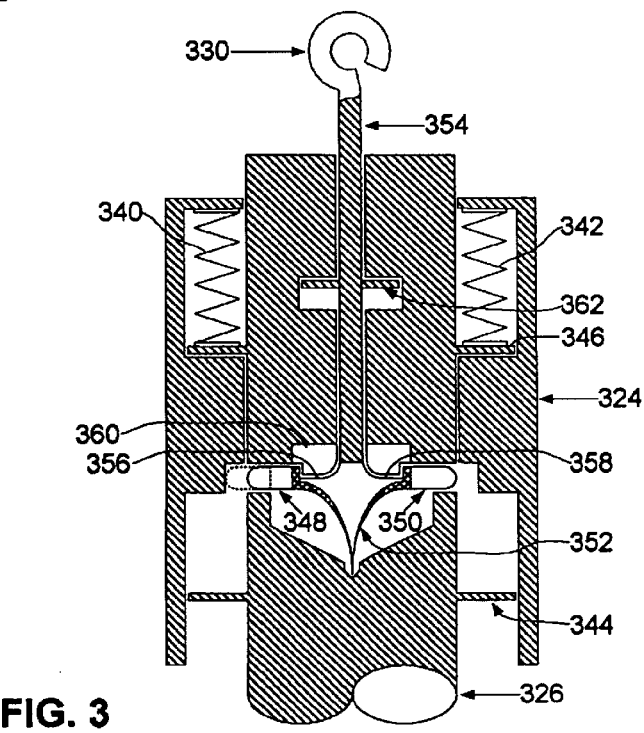
FIG. 3 shows the inner detail of the mechanism inside the wheel's support structure, which permits the engagement/disengagement of the wheel.

The angular section 100 carries a support structure to which one wheel is attached. Such a support structure may suitably consist of two welded planes 120 and 122, supporting a vertical tube 124. A vertical rod 126, carrying a wheel assembly 128, is inserted into the tube as shown. Inside the guide tube 124 exist an intricate mechanism for controlling the movement of the rod supporting the wheel, and is shown in FIG. 3 (to be discussed later). A small hook 130 emerges from the end of the rod 126 as shown. FIG. 1(b) shows a side view of the wheel's support structure. As shown in figure, the wheel is initially set to be at or above the ground level (that is, the bottom of the angular section 100) in order to permit the insertion of section 100 under the object to be lifted with minimal effort. In addition, the wheel assembly 128 must be one of the commercially available types that can swivel freely around the supporting rod 126.

Figure 2:
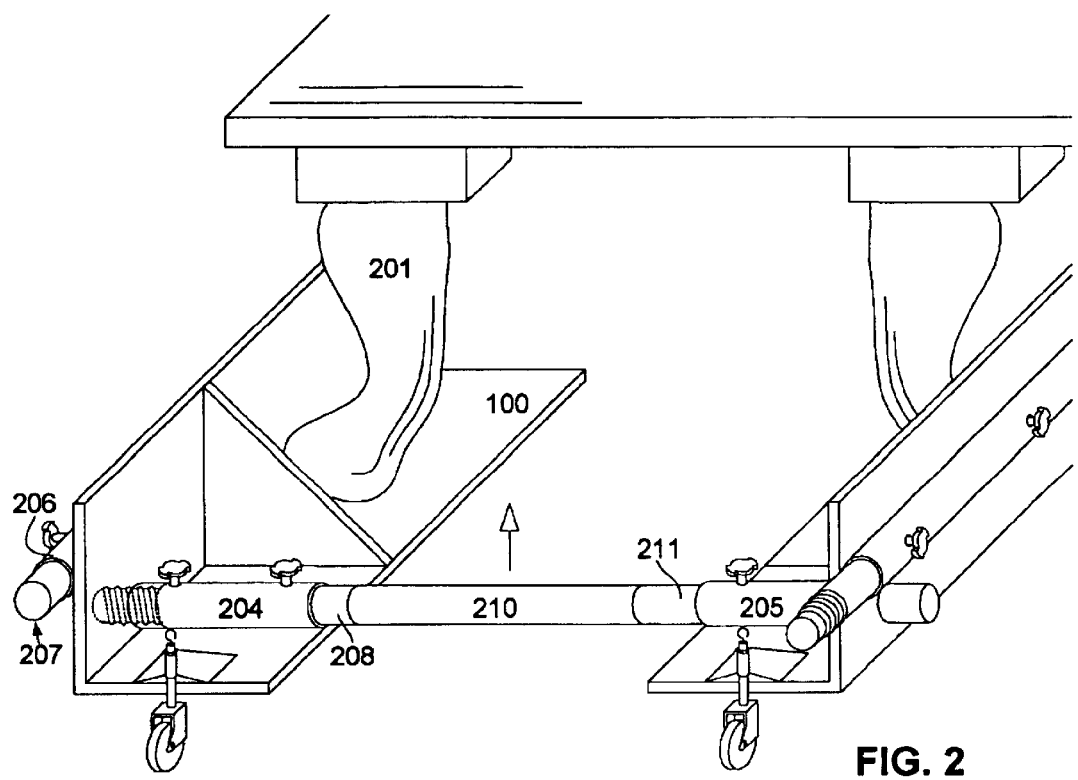
FIG. 2 shows the completely assembled apparatus of the present invention, carrying the furniture item.

FIG. 2 shows the fully assembled apparatus, according to the preferred embodiment, carrying a furniture item 201. The steps of the assembly are as follows: the angular section 100 is first inserted under the leg or corner of the furniture item as described above. The other three angular sections are similarly inserted under the other respective legs or corners (note that only the front view is shown in figure, in which only two of those angular sections appear). A number of transverse rods, 208, 210 and 211, serially attached to each other as shown in the figure, are then inserted first through conduit 205 and then through conduit 204 (or the opposite). Note that the number of such rods must not necessarily be three. As stated above, the combined length of these rods must equal or exceed the width of the furniture item 201. For that purpose, these rods must preferably be supplied as a kit containing different sizes; for example: 2 ft, 1 ft, 6 inches and 3 inches. This will allow fine-adjustment of the total length, if necessary, to accommodate the passage of the assembly through tight doorways, etc. The next step is to insert longitudinal rods, as shown in the figure, starting with rod 207, through conduit 206 and then through the next conduit in the longitudinal direction (not shown in the figure). In addition, longitudinal and transverse rods are to be inserted on the other sides of the assembly, as shown in the figure. Finally, the rod assemblies are to be secured in position by hand tightening the screws on all the conduits as explained above. Practically, a rigid "cage" has now been formed around the furniture item. The last step is to engage the wheels, since, as indicated above, all the wheels are at or above the ground level. This step is accomplished by simply pulling the entire assembly up approximately 1 inch, preferably by pulling on the middle section of the transverse rods (in the direction indicated by the upwardly pointing arrow in FIG. 2, above rod 210). This will engage the front two wheels. The step is then repeated on the other side to engage the back wheels. The entire assembly process, as described, should take only seconds.

Reference is now made to FIG. 3. This figure shows the inner mechanism that permits the wheels to be engaged when the structure supporting the wheels is lifted up slightly. As shown, the guide tube 324 houses the rod 326 that carries the wheel structure; as well as two internal springs 340 and 342. The rod 326 is fitted with two circular flanges 344 and 346. When the wheel is lifted in the upper position (as shown in FIG. 1(b)), the springs 340 and 342 are compressed. These springs must preferably be very soft springs in order to minimize the human effort required for lifting the wheel toward the upper position. When the front end of the entire assembly is lifted as explained above, the springs, together with the gravity force, push the rod 326 and hence the wheel assembly attached to it down, the wheel then drops a pre-specified distance. When the rod stops at the position shown in FIG. 3, two lock-pins 348 and 350 are pushed out of the rod by an internal spring 352. As shown, the spring 352 must preferably be made of two curved segments of spring steel joined at one end (such structure of a spring is very well known in the industry). When the lock-pins extend beyond their original position, they extend into the available space inside the inner structure of the guide tube 324, as shown by the dotted boundary of one pin. As a result, the rod 326 become locked into position inside the guide tube 324, and can carry a large load. When the operator decides to lower the assembly, he disengages the wheel by puling the hook 330 upward (it is preferable, of course, for mechanical stability, to disengage the two front wheels or the two back wheels simultaneously. This can be done, for example, by using a strap or a chain for pulling two hooks simultaneously). The hook 330, when pulled, pulls a miniature internal rod 354 that ends with two steel wires 356 and 358. These wires pull on the two lock-pins 348 and 350, and are guided by a fixed piece 360 as shown. As the two lock-pins are pulled, the rod 326 and hence the wheel structure is disengaged from the structure of the guide tube 324. The guide tube, together with the part of the assembly supporting it, therefore move down by the effect of gravity. This movement terminates when the inner structure of the guide tube comes in contact with the flange 344. Another flange, 362, is attached to the miniature rod 354 and has the function of preventing possible damage to the steel wires 356 and 358.

Figure 4:
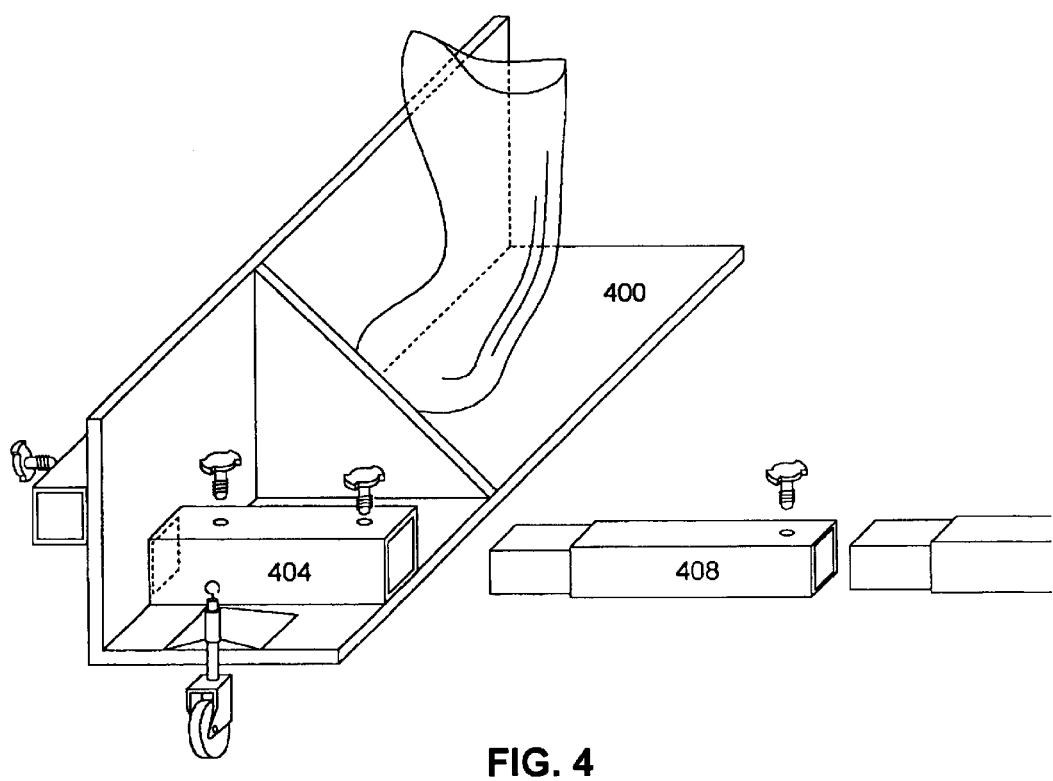
FIG. 4 shows a different embodiment of the apparatus of the present invention.

A slightly different embodiment of the invention, which will be particularly suited for items that have short widths, is to use only one angular section instead of two on each side of the item. In this case, obviously one conduit only (either in the longitudinal or the transverse direction) will be necessary. Another embodiment of the invention, still, will be the configuration shown in FIG. 4. As shown, rectangular link members can be used instead of rods or tubes. Such configuration, of course, is much less preferred since it is much harder to attach rectangular link members to each other.

Accordingly, while the invention has been described with reference to specific aspects, features, and embodiments, it will be appreciated that various modifications, alternatives, and other embodiments are possible within the broad scope of the invention, and the invention therefore is intended to encompass all such modifications, alternatives, and other embodiments, within its scope.

What is claimed is:

1. A kit used for mobilizing a heavy object, comprising:
   a plurality of rigid support members, each said rigid support member comprising
      at least one wheel, attached to a vertical support rod, means for allowing said wheel to remain at or above the lowest point in said rigid support member when said rigid support member is resting under the force of gravity and for allowing said wheel to drop freely when said rigid support member is lifted,
      a mechanism for locking said vertical support rod into said rigid support member when said wheel drops a pre-specified distance,
      an adequate surface to be inserted under a portion of said heavy object when said wheel is at or above the lowest point in said rigid support member, at least one horizontal conduit for accepting a rigid link member, means for fastening said horizontal conduit to said rigid link member;

a plurality of said rigid link members, where each rigid link member further comprises means for attachment to other rigid link members.

2. A kit according to claim 1, wherein said locking mechanism comprises at least two spring-activated lock-pins.

3. A kit according to claim 2, wherein the vertical support rod further comprises a second, miniature rod equipped with means for pulling said lock-pins, in order to effect the disengagement of the vertical support rod from the locked position.

4. A kit according to claim 1, wherein a rigid support member comprises a metal angle.

5. A kit according to claim 1, wherein a rigid support member comprises longitudinal and transverse conduits.

6. A kit according to claim 1, wherein the inner surfaces of a rigid support member are padded to prevent damage to the object being carried.

7. A kit according to claim 1, constructed and arranged such that each pair of rigid support members are connected to each other by means of at least one link member.

8. A kit according to claim 1, constructed and arranged such that the plurality of rigid support members are totally connected by means of transverse link members.

9. A kit according to claim 1, constructed and arranged such that the plurality of rigid support members are totally connected by means of longitudinal link members.

10. A kit according to claim 1, constructed and arranged such that the plurality of rigid support members are totally connected by means of longitudinal and transverse link members.

11. A kit according to claim 1, constructed and arranged such that it forms a rigid cage around the object being carried when assembled.

12. A kit according to claim 1, wherein the at least one wheel is attached to said vertical support rod by means of a wheel assembly that can swivel freely around said vertical support rod.

13. A kit according to claim 1, wherein each said rigid support member further comprises a vertical guiding conduit and at least one spring for exerting a downward force on the vertical support rod and means for guiding the vertical support rod.

14. A kit according to claim 1, wherein the rigid link members are rods.

15. A kit according to claim 1, wherein the rigid link members are tubes.

16. A kit according to claim 1, wherein the rigid link members have a rectangular cross section.

17. A kit according to claim 1, comprising steel parts.

18. A kit according to claim 1, comprising aluminum parts.

19. A kit according to claim 1, comprising steel and aluminum parts.

* * * * *